(12) United States Patent
Kawahara et al.

(10) Patent No.: US 6,839,223 B2
(45) Date of Patent: Jan. 4, 2005

(54) CAPACITOR

(75) Inventors: Kazuya Kawahara, Uji (JP); Mitsuo Tadokoro, Hirakata (JP); Yoshiki Hashimoto, Uji (JP); Toshiyuki Hata, Uji (JP); Morihiro Fukuda, Yamaguchi (JP); Tsuyoshi Yoshino, Kameoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/752,550

(22) Filed: Jan. 8, 2004

(65) Prior Publication Data

US 2004/0174659 A1 Sep. 9, 2004

(30) Foreign Application Priority Data

Jan. 10, 2003  (JP) ........................................ 2003-004454

(51) Int. Cl.[7] ............................ H01G 4/228; H01G 9/10
(52) U.S. Cl. ...................................... 361/520; 361/538
(58) Field of Search ............................... 361/508–520, 361/538

(56) References Cited

FOREIGN PATENT DOCUMENTS

| JP | 01235226 A | * | 9/1989 | ............ H01G/9/05 |
| JP | 04078121 A | * | 3/1992 | ............ H01G/9/08 |
| JP | 2001023866 | * | 1/2001 | ............ H01G/9/08 |

* cited by examiner

*Primary Examiner*—Eric Thomas
(74) *Attorney, Agent, or Firm*—Wenderoth, Lind & Ponack, L.L.P.

(57) ABSTRACT

Disclosed is an aluminum electrolytic capacitor, wherein each of anode and cathode foils is joined to a corresponding portion of a leader line through at least two caulked joint sections formed at each of the opposite ends of the flat portion, and a plurality of pressure-welded joint sections formed between the respective caulked joint sections at the opposite ends. The chaulked joint sections formed at each of the opposite ends of the portion provide a high joint strength. Further, the pressure-welded joint sections formed between the respective caulked-join sections at the opposite ends of the portion allow an electrical connection between the foil and the leader line to be stably obtained at a low resistance. This joint structure can, therefore, be applied to small-size capacitors which have not been able to be obtained by using only caulked joint, to achieve an aluminum electrolytic capacitor having a sufficient joint strength and a highly reliable electrical connection.

5 Claims, 4 Drawing Sheets

CAPACITOR

FIELD OF THE INVENTION

The present invention relates to a capacitor for use in various electronic devices.

This application is based on Japanese patent application serial No. 2003-004454, filed in Japan Patent Office on Jan. 10, 2003, the contents of which are hereby incorporated by reference.

BACKGROUND OF THE INVENTION

FIG. 6 is a sectional view showing a conventional aluminum electrolytic capacitor as one example of a capacitor related to the present invention. FIG. 7 is a developed perspective view of a capacitor element constituting the aluminum electrolytic capacitor. In FIGS. 6 and 7, the reference numeral 10 indicates a capacitor element. This capacitor element 10 comprises an anode foil 12, a cathode foil 13, and a separator 14 interposed therebetween, which are wound together and formed as a roll-shaped structure. A pair of leader lines 15 are joined to the anode foil 12 and the cathode foil 13, respectively. Each of the leader lines 15 includes a copper-undercoated and tin-plated iron wire 15c extending outside from the capacitor element 10.

The reference numeral 16 indicates a cylindrical metal case made of aluminum. The metal case 16 has a closed bottom and an open top end. The capacitor element 10 is received in the metal case 16 together with a driving electrolyte (not shown). The reference numeral 17 indicates a sealing member for sealing the open top end of the metal case 16. The sealing member 17 is formed with a pair of through-holes allowing the corresponding iron wires 5c of the leader lines 15 to penetrate therethrough and extend outside from the capacitor element 10.

As best shown in FIG. 8, each of the leader lines 15 also includes an aluminum elongated round-bar-shaped portion 15a having one end formed with a recess (not shown). The iron wire 15c is inserted into the recess, and joined to the round-bar-shaped portion 15a with welding or the like. The other end of the round-bar-shaped portion 15a is flattened to provide a flat portion 15b. This flat portion 15b is joined to the anode foil 12 (or the cathode foil 13). The flat portion 15b of the leader line 15 is joined to the anode foil 12 in a plurality of joint sections 15d by means of ultrasonic welding, caulking or pressure welding.

In this connection, Japanese Patent Laid-Open Publication No. 2000-12386 can be referred to for reference as a published document related to this application.

As described above, in the conventional aluminum electrolytic capacitor, the joint between the anode and cathode foils 12, 13 and the corresponding leader lines 15 is achieved by means of ultrasonic welding, caulking or pressure welding. For example, a joint section formed by ultrasonic welding, or an ultrasonic-welded joint section, is intermetallically bonded together. Thus, the ultrasonic-welded joint section can advantageoulsy have a low resistance, and the resistance value can be reliably maintained without deterioration even under harsh conditions such as conditions of a reliabilit test. However, the ultrasonic-welded joint section involves problems of difficulty in obtaining a sufficient joint strength due to adverse affects from a dielectric oxide layer (not shown) formed on the surface of the anode foil 12, and attachment of foreign matters due to sparks generated during welding.

While a joint section formed by caulking, or a caulked joint section, can advantageously provide a sufficient joint strength, the caulked joint section has a relatively high resistance, and the strength of the anode and cathode foils 12, 13 is inevitably reduced due to the need for subjecting them to perforating. Thus, the caulked joint cannot be applied to small-size capacitors.

As with the ultrasonic-welded joint section, a joint section formed by pressure welding, or a pressure-welded joint section, can be intermetallically bonded to advantageously allow the joint section to have a low resistance which is reliably maintained without deterioration even under harsh conditions. However, the pressure-welded joint section has a joint strength inferior to that of the ultrasonic-welded joint section or caulked-joint section.

Each of the above joining means has both advantages and disadvantages, and it is difficult to meet all requirements. Thus, practically, there has been no choice but to select a suitable one of the joining means with respect to each type of capacitor.

Further, in the conventional aluminum electrolytic capacitor, the sealing member 17 is formed with the pair of through-holes for allowing the corresponding anode and cathode leader lines 15 to penetrate through and extend outside. Thus, when the aluminum electrolytic capacitor is used under high-temperature and high-humidity conditions, the pair of through-holes formed in the sealing member 17 is likely to cause deterioration in sealing against the driving electrolyte impregnated in the capacitor element 10.

SUMMARY OF THE INVENTION

In view of the above conventional problems, it is therefore an object of the present invention to provide a highly reliable capacitor capable of achieving a high joint strength and a reliable electrical connection between an anode or cathode foil and a leader line, and assuring an excellent sealing performance even in use under high-temperature and high-humidity conditions.

In order to achieve the above object, the present invention provides a capacitor comprising a capacitor element including an anode foil, a cathode foil, and a separator interposed therebetween, and a pair of leader lines having portions joined, respectively, to the anode and cathode foils. Each of the anode and cathode foils is joined to the corresponding portion of the leader line through at least two caulked joint sections formed at each of the opposite ends of the portion, and a plurality of pressure-welded joint sections formed between the respective caulked joint sections at the opposite ends.

According to the above capacitor, in the joint structure between the anode or cathode foil and the corresponding leader line, the caulked joint sections provide a high joint strength, and the pressure-welded joint sections allow an electrical connection between the foil and the leader line to be stably obtained at a low resistance. Thus, the enhanced joint strength and reliable electrical connection allows the joint structure to be applied to small-size capacitors which have been difficult to be obtained by using the conventional caulked joint.

Other features and advantages of the present invention will be apparent from the accompanying drawings and from the detailed description.

DESCRIPTION OF THE PREFERRED EMBODIMENT

[First Embodiment]

Figure 1:
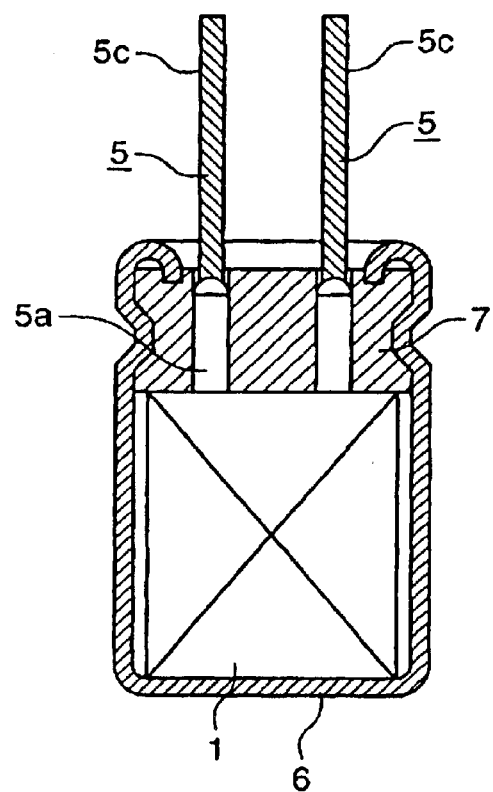
FIG. 1 is a sectional view showing an aluminum electrolytic capacitor according to a first embodiment of the present invention.
Figure 2:
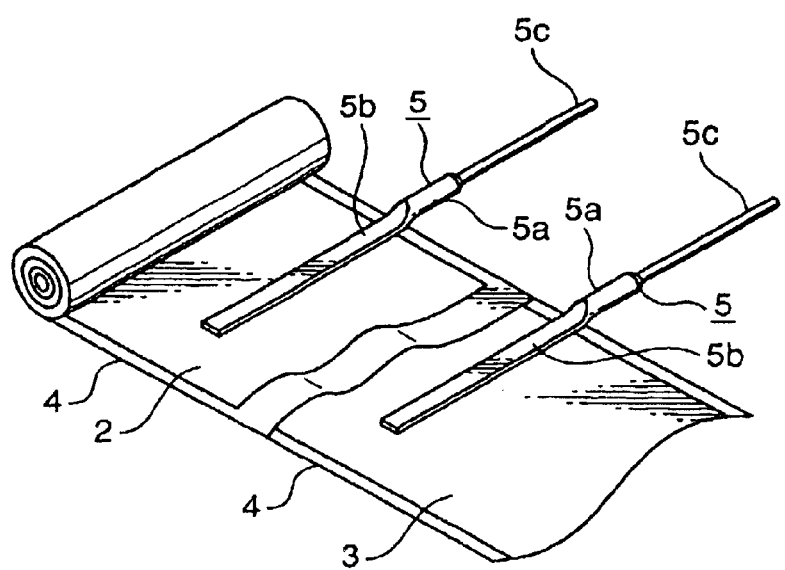
FIG. 2 is a developed perspective view of a capacitor element constituting the aluminum electrolytic capacitor.
Figure 3:
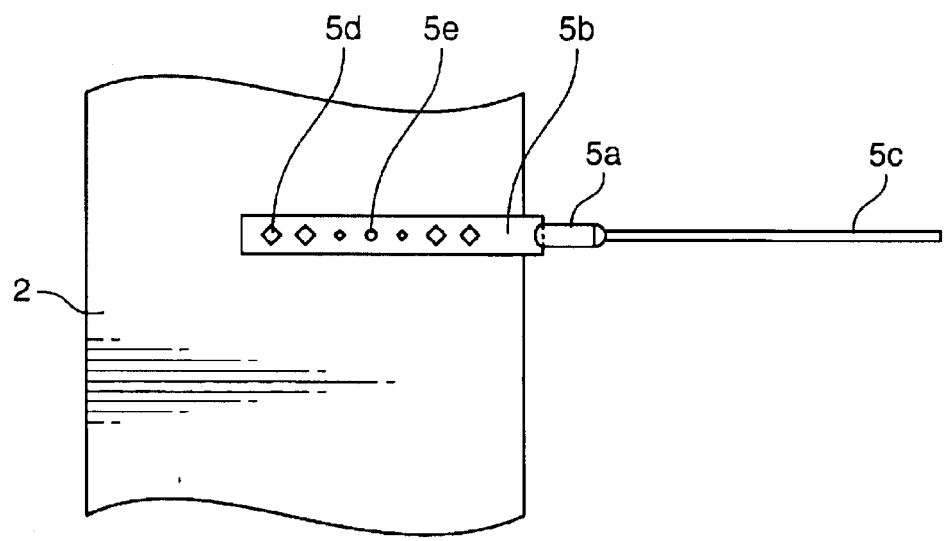
FIG. 3 is a fragmentary top plan view of an anode foil with a leader line joined thereto in the aluminum electrolytic capacitor.

With reference to FIGS. 1 to 3, a first embodiment of the present invention will now be described.

FIG. 1 is a sectional view showing an aluminum electrolytic capacitor as one example of a capacitor according to the first embodiment of the present invention. FIG. 2 is a developed perspective view of a capacitor element constituting the aluminum electrolytic capacitor. FIG. 3 is a fragmentary top plan view of an anode foil with a leader line joined thereto in the aluminum electrolytic capacitor.

In FIGS. 1 to 3, the reference numeral 1 indicates a capacitor element. This capacitor element 1 comprises an anode foil 2, a cathode foil 3, and a separator 4 interposed therebetween, which are wound together and formed as a roll-shaped structure. A pair of leader lines 5 are joined to the anode foil 2 and the cathode foil 3, respectively. Each of the leader lines 5 includes a copper-undercoated and tin-plated iron wire 5c extending outside from the capacitor element 1.

The reference numeral 6 indicates a cylindrical metal case made of aluminum. The metal case 6 has a closed bottom and an open top end. The capacitor element 1 is received in the metal case 6 together with a driving electrolyte (not shown). The reference numeral 7 indicates a sealing member for sealing the open top end of the metal case 6. The sealing member 7 is formed with a pair of through-holes allowing the corresponding iron wires 5c of the leader lines 5 to penetrate therethrough and extend outside from the capacitor element 1.

As best shown in FIG. 3, each of the leader lines 5 also includes an aluminum elongated round-bar-shaped portion 5a having a diameter of 2 mm and one end formed with a recess (not shown). The iron wire 5c having a diameter of 0.8 mm is inserted into the recess, and joined to the round-bar-shaped portion 5a with welding or the like. The other end of the round-bar-shaped portion 5a is flattened to provide a flat portion 5b having a size of 26 mm (length)×3 mm (width)×0.4 mm (thickness). This flat portion 5b is joined to the anode foil 2 (or the cathode foil 3). The flat portion 5b of the leader line 5 and the anode foil 2 are joined together through two caulked joint sections 5d formed at each of the opposite ends of the flat portion 5b, and three cold-pressure-welded joint sections 5e formed along a straight line connecting between the respective caulked joint sections 5d at the opposite ends of the flat portion 5b. The caulked joint sections 5d and the cold-pressure-welding joint section 5e are evenly arranged at a pitch of 3 mm.

According to the capacitor constructed as above, the two caulked joint sections formed at each of the opposite ends of the flat portion 5b can provide a high joint strength. In addition, the three cold-pressure-welded joint sections 5e formed along a straight line connecting between the respective caulked-join sections 5d at the opposite ends of the flat portion 5b allow an electrical connection between the foil and the leader line to be stably obtained at a low resistance. Thus, this joint structure can be applied to small-size capacitors which have not been able to be obtained by using only a caulked joint.

[Second Embodiment]

A second embodiment of the present invention will be described below. The second embodiment is fundamentally constructed such that each of the anode and cathode foils in the aluminum electrolytic capacitor according to the first embodiment has an aluminum substrate exposed outside in a region thereof where the corresponding flat portion of the leader line is joined thereto. Any other structure is the same as that in the first embodiment. Thus, the same components as those in the first embodiment are defined by the same reference numerals, and their detailed description will be omitted. Only the different structure between the first and second embodiments will be described with reference to FIG. 4.

Figure 4:
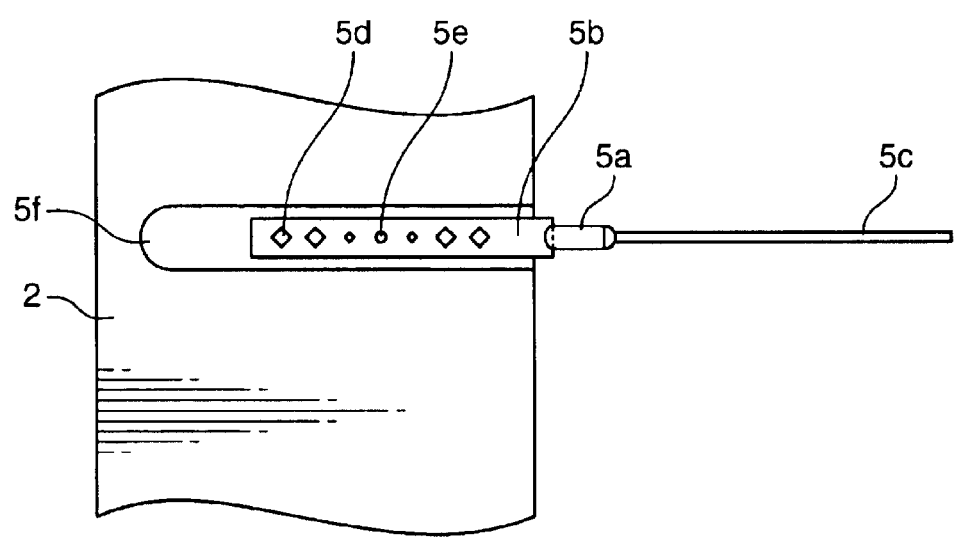
FIG. 4 is a fragmentary top plan view of an anode foil with a leader line joined thereto in an aluminum electrolytic capacitor according to a second embodiment of the present invention.

FIG. 4 is a fragmentary top plan view of an anode foil with a leader line joined thereto in an aluminum electrolytic capacitor as one example of a capacitor according to the second embodiment of the present invention. In FIG. 4, the reference numeral 5f indicates a region where an aluminum substrate of an anode foil 2 is exposed outside. The aluminum-exposed region 5f may be formed by masking a desired region of the surface of the anode foil 2 in the process of preparing the anode foil 2 to prevent the formation of a dielectric oxide film in the region, or by removing a dielectric oxide film formed on the surface of the anode foil 2 over a desired region through a mechanical post-processing to expose the aluminum substrate. In the second embodiment, the aluminum-exposed region 5f is formed to have a size of 36 mm (length)×5.5 mm (width), which is sufficiently greater than the size [26 mm (length)×3 mm (width)] of a plat portion 5b of a leader line 5 to be joined to the aluminum-exposed region 5f.

According to this capacitor, the flat portions 5b of the leader lines 5 can be joined, respectively, to the surfaces of the anode and cathode foils 2, 3 having no dielectric oxide layer. Thus, the foils and the leading lines can be adequately joined together so as to particularly reduce the resistance therebetween to provide significantly enhanced reliability in electrical connection.

While the size of the flat portion 5b of the leader line 5, the pitch between the caulked joint sections 5d or the cold-pressure-welded joint sections 5e, and the size of the aluminum-exposed region 5f have been specifically described in the first or second embodiment, those skilled in the art will recognize that such exemplary numerical values are not intended to limit the present invention.

[Third Embodiment]

A third embodiment of the present invention will be described below. The third embodiment is fundamentally constructed such that the leader line joined to the cathode foil in the aluminum electrolytic capacitor according to the first embodiment has a surface region in contact with the sealing member, which is formed with an electrical insulating resin film layer. Any other structure is the same as that in the first embodiment. Thus, the same components as those in the first embodiment are defined by the same reference numerals, and their detailed description will be omitted. Only the different structure between the first and second embodiments will be described with reference to FIG. 5.

Figure 5:
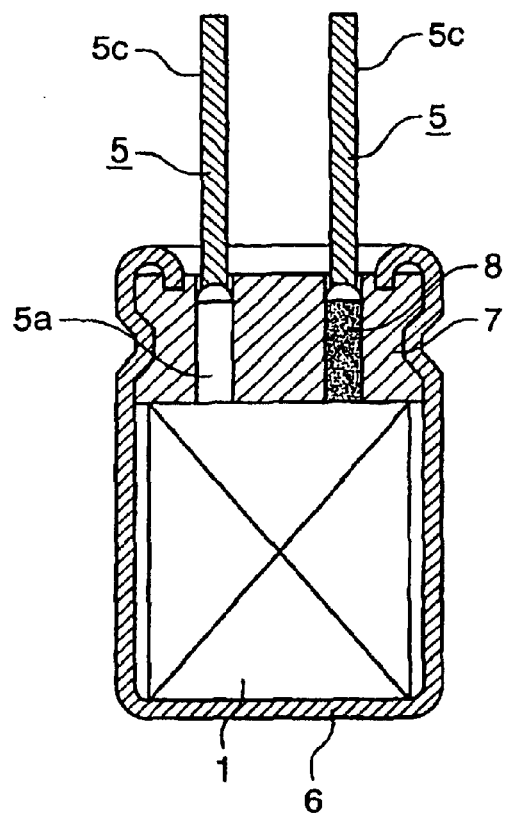
FIG. 5 is a sectional view showing an aluminum electrolytic capacitor according to a third embodiment of the present invention.
Figure 6:
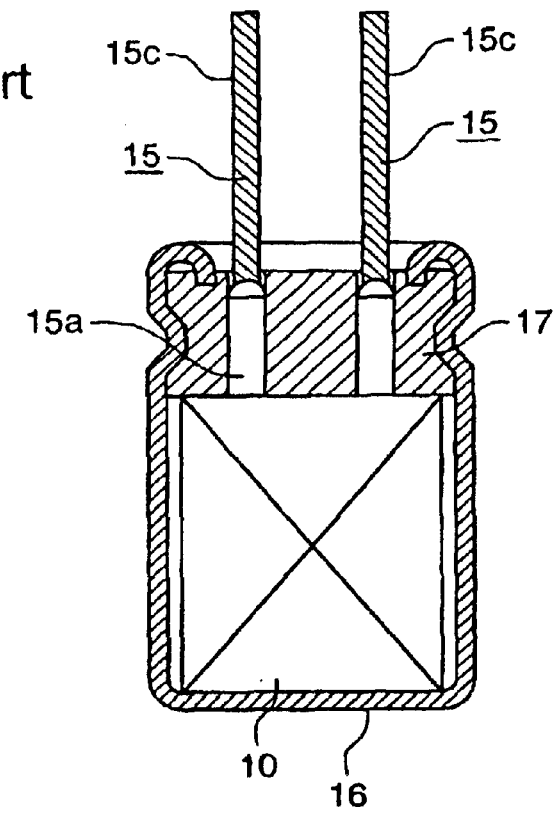
FIG. 6 is a sectional view showing a conventional aluminum electrolytic capacitor.
Figure 7:
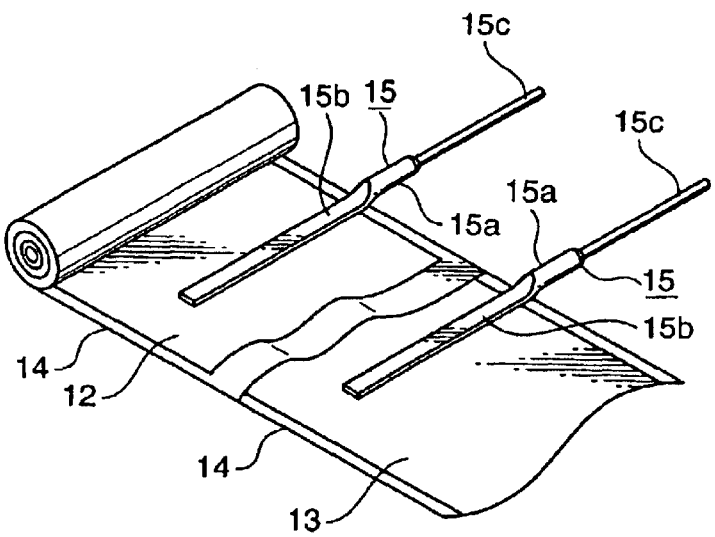
FIG. 7 is a developed perspective view of a capacitor element constituting the conventional aluminum electrolytic capacitor.
Figure 8:
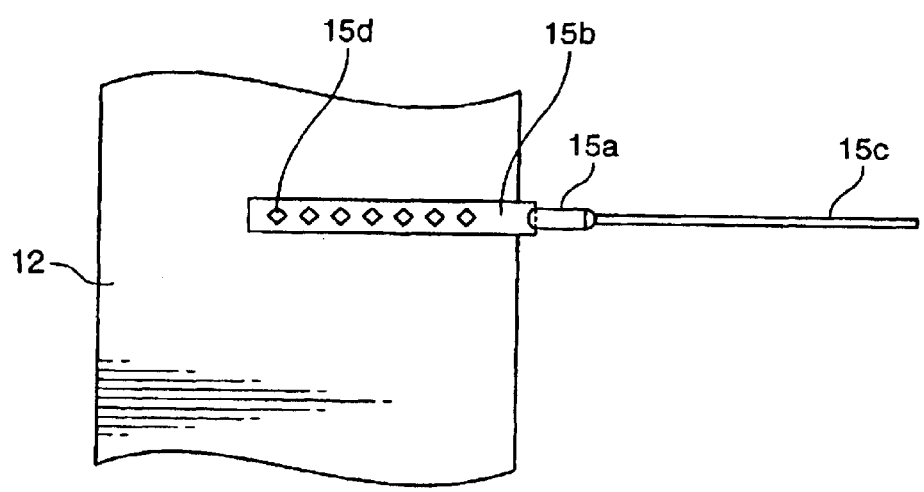
FIG. 8 is a fragmentary top plan view of an anode foil with a leader line joined thereto in the conventional aluminum electrolytic capacitor.

FIG. 5 is a sectional view showing an aluminum electrolytic capacitor as one example of a capacitor according to a third embodiment of the present invention. In FIG. 5, the reference numeral 8 indicates an electrical insulating resin film layer. This electrical insulating resin film layer 8 is formed on a surface region of a leader line 5 joined to a cathode foil 3, or a cathode leader line, which is in contact with a sealing member 7. In the third embodiment, the electrical insulating resin film layer 8 was formed by preparing modified polypropylene which is one kind of modified polyolefin resin, applying the modified polypropylene on the above surface region using a brush, and then subjecting the surface region with the modified polypropylene to hot-air drying at about 200° C. For 2 min or more.

The modified polypropylene as the resin material of the electrical insulating resin film layer 8 may be applied to the surface of the cathode leader line 5 before jointed to the cathode foil 3, or to the surface of the cathode leader line 5 after jointed to the cathode foil 3 and then wound together with a capacitor element 1.

Twenty pieces of the above aluminum electrolytic capacitors according to the third embodiment and 20 pieces of conventional capacitors (which includes a cathode leader line having no electrical insulating resin film layer) as a comparative example were prepared, and 2.5 V of DC voltage was applied to each of the aluminum electrolytic capacitors under a high-temperature atmosphere of 70° C. Under this condition, a time-period until a sealing defect is caused, and electrical characteristics were measured. The test result is shown in Table 1.

TABLE 1

|  | Initial Value | | | After 5000 hours | | |
| --- | --- | --- | --- | --- | --- | --- |
|  | Capacitance (F) | Internal Resistance (m Ohm) | Sealing Defect (Number of Pieces) | Capacitance (F) | Internal Resistance (m Ohm) | Sealing Defect (Number of Pieces) |
| Inventive Capacitors | 10.5 | 65 | 0/5 | 9.2 | 82 | 0/5 |
| Conventional Capacitors | 10.3 | 67 | 0/5 | 8.1 | 100 | 3/5 |
|  | After 10000 hours | | | | | |
|  | Capacitance (F) | Internal Resistance (m Ohm) | Sealing Defect (Number of Pieces) | | | |
| Inventive Capacitors | 8.7 | 100 | 0/5 | | | |
| Conventional Capacitors | 6.5 | 157 | 5/5 | | | |

As seen in Table 1, in the conventional aluminum electrolytic capacitors, the sealing defect was observed after about 5000 hours, and the changes in the internal resistance and the capacitance were increased as compared to the initial stage after 10000 hours. By contrast, it can be proved that after both 5000 and 10000 hours, the aluminum electrolytic capacitors according to the present invention have no sealing defect and less characteristic change than the conventional capacitors.

While the third embodiment has been described in connection with the capacitor using modified polypropylene which is one kind of modified polyolefin resin, as the resin material of the electrical insulating resin film layer 8, the present invention is not limited thereto, but the electrical insulating resin film layer 8 may be made of one selected from the group consisting of epoxy resin, polyester resin and fluorine resin, to obtain the same effects as that in the third embodiment.

Furthermore, while the first to third embodiments have been described in connection with the capacitors including the anode foil 2 having a surface formed with a dielectric oxide layer, the present invention is not limited thereto. For example, in an electric double layer capacitor, an aluminum foil having a surface formed with a carbon electrode layer may be applied to each of anode and cathode foils thereof.

[Summary of Embodiments]

Various embodiments mentioned above can be summarized as follows.

A capacitor comprises a capacitor element including an anode foil, a cathode foil, and a separator interposed therebetween, which are wound together to form a roll-shaped structure, a pair of leader lines having flat portions joined, respectively, to the anode and cathode foils, a metal case containing the capacitor clement, and a sealing member sealing the open end of the case. In this capacitor, each of the anode and cathode foils is joined to the corresponding flat portion of the leader line through at least two caulked joint sections formed at each of the opposite ends of the flat portion, and a plurality of pressure-welded joint sections formed along a straight line connecting between the respective caulked joint sections at the opposite ends.

According to the above capacitor, in the joint structure between the anode or cathode foil and the corresponding leader line, the caulked joint sections provide a high joint strength, and the pressure-welded joint sections allow an electrical connection between the foil and the leader line to be stably obtained at a low resistance. Thus, the enhanced joint strength and reliable electrical connection allow the joint structure to be applied to small-size capacitors which have been difficult to be obtained by using the conventional caulked joint.

Preferably, the number of the caulked joint sections is greater than that of the pressure-welded joint sections. Thereby, the increased caulked joint sections can provide a more stable joint strength.

The pressure-welded joint sections may be formed by cold pressure welding. In this case, a production facility of the capacitor can be simplified, and the joint structure can be obtained without excessively heating the anode and cathode foils to eliminate the risk of degradation in performance.

The each of the anode and cathode foils may comprise an aluminum foil, and the aluminum foil of each of the anode and cathode foils may be exposed in at least a region thereof where the corresponding flat portion of the leader line is joined thereto. In this case, the flat portions of the leader lines can be joined, respectively, to the surfaces of the anode and cathode foils having no dielectric oxide layer or the like to provide significantly enhanced reliability in electrical connection.

In at least the leader line joined to the cathode foil among the leader lines, a surface region in contact with the sealing member may be formed with an electrical insulating resin film layer made of at least one selected from the group consisting of modified polyolefin resin, epoxy resin, polyester resin and fluorine resin. In this case, a high sealing performance can be maintained even if the capacitor is used under high-temperature and high-humidity conditions.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A capacitor comprising:

a capacitor element including an anode foil, a cathode foil, and a separator interposed therebetween, which are wound together to form a roll-shaped structure;

a pair of leader lines each having an aluminum elongated round-bar-shaped portion, a copper-undercoated and tin-plated iron wire joined to one of the ends of said round-bar-shaped portion, and a flat portion formed by flattening the other end of said round-bar-shaped portion, said flat portions being joined to said anode and cathode foils, respectively;

a metal case having a closed bottom and an open top end, and containing said capacitor element; and a sealing member sealing the open top end of said case, said sealing member being formed with a pair of through-holes allowing said leader lines to penetrate therethrough to extend outside, wherein each of said anode and cathode foils is joined to said corresponding flat portion of said leader line through at least two caulked joint sections formed at each of the opposite ends of said flat portion, and a plurality of pressure-welded joint sections formed along a straight line connecting between said respective caulked joint sections at said opposite ends.

2. The capacitor as defined in claim 1, wherein the number of said caulked joint sections is greater than that of said pressure-welded joint sections.

3. The capacitor as defined in claim 1, wherein said pressure-welded joint sections are formed by cold pressure welding.

4. The capacitor as defined in claim 1, wherein each of said anode and cathode foils comprises an aluminum foil, wherein said aluminum foil of each of said anode and cathode foils is exposed in at least a region thereof where said corresponding flat portion of said leader line is joined thereto.

5. The capacitor as defined in claim 1, wherein at least said leader line joined to said cathode foil among said leader lines has a surface region in contact with said sealing member, said surface region being formed with an electrical insulating resin film layer made of at least one selected from a group consisting of modified polyolefin resin, epoxy resin, polyester resin and fluorine resin.

* * * * *